L. MEGOWEN.
Evaporating Pan.
No. 43,220.
Patented June 21, 1864.
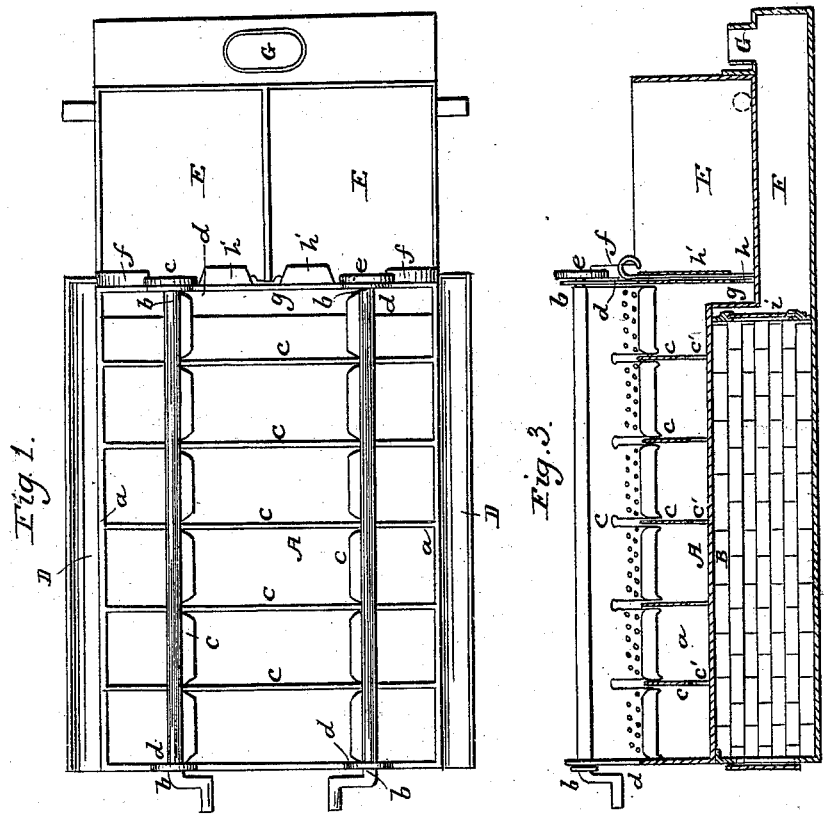
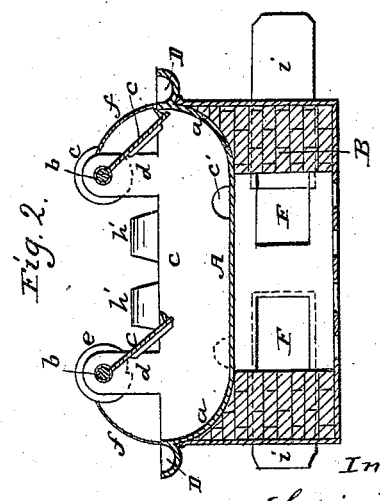
Witnesses:
Henry Morris
G. W. Reed
Inventor:
Lewis Megowen
per Munn & Co
Attorneys.

UNITED STATES PATENT OFFICE.

LEWIS MEGOWEN, OF UPPER ALTON, ILLINOIS.

IMPROVED EVAPORATING-PAN FOR SUGAR AND SIRUP.

Specification forming part of Letters Patent No. 43,220, dated June 21, 1864.

*To all whom it may concern:*

Be it known that I, LEWIS MEGOWEN, of Upper Alton, in the county of Madison and State of Illinois, have invented a new and Improved Evaporating-Pan; and I do hereby declare that the following is a full, clear, and exact description thereof, which will enable others skilled in the art to make and use the same, reference being had to the accompanying drawings, forming part of this specification, in which—

Figure 1 represents a plan top view of my invention. Fig. 2 is a transverse vertical section of the same. Fig. 3 is a longitudinal vertical section of the same.

Similar letters of reference in the three views indicate corresponding parts.

This invention consists in the application to an evaporating-pan of oscillating skimmers hung on gudgeons, which have their bearings in lugs or standards rising from the ends of the pan, and are provided with slots to clear the partitions of said pan, in combination with its curved sides, and with troughs running along their edges in such a manner that by the action of said skimmers the scum rising in the several compartments of the pan can be thrown out into the troughs with little exertion or loss of time.

The invention consists, also, in a pan provided with a series of transverse partitions with holes near the bottom, arranged in a zigzag line, in combination with a well at the inner end communicating, through suitable gates, with two finishing-pans placed over separate flues, either one of which can be opened and closed independently of the other, and with suitable skimmers, in such a manner that the juice in passing through the first pan is heated, and when freed from its impurities passes into the well, and thence in the finishing-pan, where it is readily boiled down to the required consistency.

A represents a pan, made of sheet metal or any other suitable material, and placed on an arch, B, which may be built up of brick, or made of any other suitable material, and which is to be provided with a fire-grate on one end, so that a fire can be made and the pan can be heated in the ordinary manner. The sides $a$ of the pan A are curved, and they describe a portion of a circle the centers of which coincide with the centers of the gudgeons $b$, from which the skimmers C are suspended. These skimmers consist of flat metal plates, with lips turned inward at their lower edges, and slotted to clear the partitions $c$ in the pan. The gudgeons $b$ have their bearings in lugs or brackets $d$, rising from the ends of the pan, and said gudgeons extend through the brackets at the outer ends to form cranks by means of which the skimmers can be operated, and at the inner ends to make room for disks $e$, provided with one or more teeth, which can be made to engage with pawls $f$, attached to the edges of the pan, so that by throwing said pawls in gear with the disks the skimmers can be held up in any desired position. Said skimmers extend down into the pan to such a depth as may be requisite to enable them to reach the scum that rises on the surface of the juice, and by turning them out toward the edges of the pan the scum is swept off into troughs D, which are rigidly attached to the sides of the pan A. The partitions $c$ divide the pan into a number of compartments, which communicate with each other by means of holes $c'$, which are made in the partitions close down to the bottom of the pan, and which are arranged in a zigzag line, so that the juice has to travel transversely across each partition in order to pass from one end of the pan to the other. During this zigzag course the juice alternately passes over the hottest portion of the pan, causing the scum to rise and to float off toward the sides, whence it can be easily removed by the skimmers. A portion of the last compartment of the pan A forms a well, $g$, extending across the whole width of said pan, and this well communicates, by means of openings $h$ and gates $h'$, with the finishing-pans E. These finishing-pans are situated over the two flues F, which extend from the arch B to the chimney G. Each of these flues can be opened or closed by means of dampers $i$, so that either one of said pans can be cooled without interrupting the operation of boiling the juice in the other. By these means one batch of juice after the other can be finished without interruption, and a good sirup is produced with comparatively little labor and expense in fuel.

What I claim as new, and desire to secure by Letters Patent, is—

1. The oscillating skimmer C, slotted to fit the partitions $c$ of the pan A, and suspended from gudgeons $b$, in combination with the spherical sides $a$ of the pan, and with the troughs D, constructed and operating in the manner and for the purpose substantially as herein shown and described.

2. The well $g$, in the last compartment of the pan A, in combination with the zigzag holes $c'$, finishing-pans E, double flues F, and dampers $i$, all constructed and operating in the manner and for the purpose specified.

LEWIS MEGOWEN.

Witnesses:
 JOSEPH BURNAP,
 W. CAMPBELL.